June 30, 1970     H. K. LÜNIG     3,518,350
CONTROL METHOD AND CONTROL SYSTEM FOR
BATCH-LIKE ELECTRIC MELTING FURNACE
Filed Feb. 23, 1967

Inventor
HERMANN K. LÜNIG

United States Patent Office 3,518,350
Patented June 30, 1970

3,518,350
CONTROL METHOD AND CONTROL SYSTEM FOR BATCH-LIKE ELECTRIC MELTING FURNACE
Hermann Karl Lünig, Duisburg, Germany, assignor to DEMAG-Elektrometallurgie G.m.b.H., Duisburg, Germany
Filed Feb. 23, 1967, Ser. No. 617,934
Claims priority, application Germany, Mar. 7, 1966, D 49,520
Int. Cl. H05b 7/18
U.S. Cl. 13—12
12 Claims

ABSTRACT OF THE DISCLOSURE

The invention is a control method and a control system for batch-type electric melting furnaces, such as electric arc and induction furnaces. In the method, the total weight of a batch and the specific unit electric energy requirement for the material of the batch are used to derive the total electric energy requirement for a particular process stage and the derived value is continuously compared with the value of the energy actually used during the particular process stage. When the two energy values attain equality, the particular stage is terminated or, alternatively, the next process stage is initiated.

In the control system, a weighing unit provides the batch or charge weight to an adding device, and the specific energy consumption for the particular material to be processed is set on an adjustable value device. The batch weight and the specific energy consumption value are fed to a computer which derives the total electric energy requirement for the particular process stage. The output of the computer is applied to one side of a comparing unit. The actual energy consumption is applied to the other side of the comparing unit. When the two values are equal, the supply of energy to the furnace is interrupted to terminate the process stage or, alternatively, the apparatus is switched over to a further process stage in which a comparison between desired and actual values is again made and, and when the desired and actual values are equal, the further stage is interrupted. In this further stage, the pre-calculated energy requirements are fed to the computer from a device operating on a punched card or punched tape.

BACKGROUND OF THE INVENTION

As stated, the invention relates to a control method and control system for discontinuous or batch-type electric melting furnaces, such as, for example, electric arc and induction furnaces.

Furnaces of these types are used for melting metallic or non-metallic scrap, and the properties of the melt can be influenced by means of additions in order to obtain definite melt grades. Melting in such furnaces is usually carried out in various process stages, such as a melting-down stage, a refining stage, a carburizing stage, and a superheating stage in which the melt is heated to the final temperature, and which may be followed by a stage in which the melt is held at the final temperature. This latter stage is of importance in the case of trouble and also when the heat cannot be tapped as soon as it is finished.

During the various process stages, electric energy is consumed, with the consumption being dependent on the pre-set voltage and also on the properties of the material to be melted. As a rule, melting sequences are still operated on a pronounced empirical basis. Thus, the various process stages are normally followed by visual checking of the material in the furnace, by temperature measurements, or by analysis. Aside from the fact that the human element renders such inspections unreliable, it is also very rarely possible to reproduce exactly complicated processes of this nature. For example, completion of the melting-down process in the electric arc furnace can be verified only by opening the furnace door and assessing the degree of liquefaction of the material therein and in a purely subjective manner. It is also left to the discretion of the furnace operators to determine the exact time for carrying out this check.

For the above and similar reasons, it is not astonishing that energy consumption is subject to more or less heavy fluctuation. In most cases, the consumption is too high, and this has a decidedly adverse effect on the production costs.

With present operating methods, energy consumption is usually determined by measuring the differences between power meter readings taken at the beginning and at the end of a process stage, as well as using the power meter reading taken at the completion to the overall heat cycle. Since only the specific power consumption per unit of weight, such as the power consumuption per ton, provides a clear picture of the economics of the process, it is also necessary to divide the absolute power consumption by the charge or batch weight.

There is a known process in which a certain kwh. value is pre-set for the melt down process in a furnace plant. In this process, the preset power value corresponds only to the approximate expected power consumption. The furnace power is interrupted when the preset power value has been consumed, and when the meter has also run down to zero. Tables, or similar aids, showing the power consumption for a given tonnage are used for determining the amount of energy for preset. The power value is preset and is checked by counting back to zero, the counting impulses being provided by an impulse transmitter.

There is another known system in which the material charged into the furnace, mostly in batches, is reported to a central control station common to several furnace installations. At the central control station, the presumed power requirement is calculated and preset, as just described, for the particular furnace installation. At the same time, the furnace operating personnel is allowed a certain period of time. However, this time allowance must be continuously checked, as any unexpected trouble, other unusual occurrences, or varying melting conditions can affect the required time allowance. For example, the preset time may have to be extended. Consequently, the electric energy consumption and the time factor are not corresponding values which are suitable as a basis for controlling discontinuous or batch-type electric melting furnaces. This is especially true in view of the fact that the energy input is usually controlled as a factor of the furnace wall lining temperature. Radiation pyrometers are generally used for measuring the lining temperature. However, since such radiation pyrometers does not accurately indicate temperature and are also difficult to install in the furnace, they do not furnish dependable values for measurement of energy input.

SUMMARY OF THE INVENTION

The present invention uses an approach to the energy consumption problem which is different from those used hitherto and which permits furnace operation to be carried out substantially automatically. Primarily, the present invention is based on the principle of automatically or deriving the desired energy input from established values, these values including, in particular, the charge or batch weight and the specific melting power value, such as kwh. per ton. The derived value is continuously compared with the amount of energy actually consumed, and, as soon as the value of energy actually consumed equals the desired value, the furnace is either shut down or switched over to the next operating or process stage.

Thus, the invention control method and control system are based on the amounts of energy to be put in and those actually consumed, and the temperature and time factors are completely disregarded. However, in using the invention, there is no objection against instruments for local temperature measurements being provided to indicate excessive temperatures, such as lining wear indicating sensors. These local temperature measurements in no way affect the performance of normal operations.

A feature of the control system of the invention is that, in each process stage, a multiplier calculates the desired value of the energy input for the particular processing phase from the charge weight and the energy input required for this phase, such as in kwh. per ton, and feeds this result to the comparing unit. In all process phases or stages, only the total electric energy requirement for the particular phase or stage is used as a desired value, and both the desired value and the actual value are determined by counting upward, with counting being re-started for each heat cycle.

In accordance with another feature of the invention, if two or more charging operations are involved, the desired value of the total energy input for melting the first batch or charge is kept lower than that for processing the last batch or charge, so that the succeeding batch is charged into the furnace when the first batch is still not yet completely melted down, for example.

In further accordance with the invention, a voltage which is pre-set by means of a punched tape or by hand is indicated or automatically set during switching over from one processing phase to the initiation of the next processing phase. The control system of the invention further includes an adding device which feeds, to the multiplier or also to the comparing unit, an impulse corresponding to the weight of the additions charged, and digital counters or computers are used for calculating the desired and actual values for each process stage.

The invention has numerous remarkable advantages. The principal advantage is that it is possible to reduce the energy consumption and also the lining wear of the furnace to a minimum, with the production rate being raised to a maximum at the same time. A further advantage is the possibility of reproducing the melting sequences at any time, which permits definite melting sequences to be established for definite finished product grades.

Accordingly, an object of the invention is to provide a novel and improved control method for batch-type electric melting furnaces, such as electric arc and induction furnaces.

Another object of the invention is to provide an improved control system for these batch-type electric melting furnaces.

A further object of the invention is to provide such a control method and system in which the desired value of energy consumption for processing a batch of material is compared with the actual value of energy consumed during such processing and, when the two values attain equality, the processing stage is interrupted.

Yet, another object of the invention is to provide such a control method and system which is free of disadvantages of the prior art methods and systems.

Still a further object of the invention is to provide such a control method and system by which it is possible to reduce the energy consumption and also the lining wear of the furnace to a minimum, while at the same time raising the production rate to a maximum.

Yet, another object of the invention is to provide such a control method and system by means of which melting sequences can be reproduced at any time, thus enabling establishment of definite melting sequences for definite finished product grades.

BRIEF DESCRIPTION OF THE DRAWINGS

For an understanding of the principles of the present invention, reference is made to the following description of typical embodiments thereof as illustrated in the accompanying drawings.

In the drawings.

DESCRIPTION OF THE PREFERRED EMBODIMENTS

Figure 1:
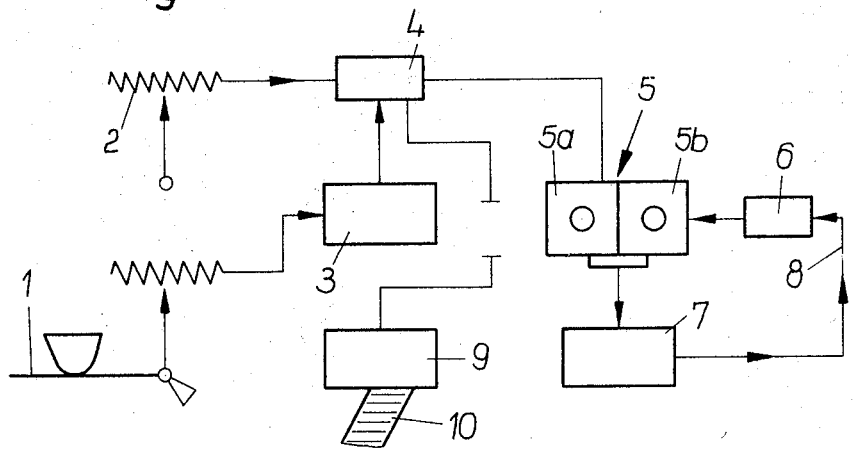
FIG. 1 is a schematic diagram of the invention control system as used during the melt-down operation in accordance with the invention method.

As schematically illustrated in FIG. 1, the batch or charge weight value, as determined by a weighing unit 1, is supplied by either the digital or analog method, or by hand in accordance with instructions, to a ton-value storage unit such as the accumulating register or adder 3. The specific energy consumption for melting down a particular material can be preset on the device 2 which is adjustable either infinitely or in steps. The accumulator charge weight value and the specific energy consumption are fed, from the units 3 and 2, respectively, to a computer, such as a multiplier 4, which determines the product of these values. The output of multiplier or computer 4 is the desired value of energy consumption and is supplied to one side 5a of a comparing unit 5.

The actual energy consumption of the furnace is fed to the other side 5b of comparing unit 5 from the electric arc or induction furnace installation. This feeding may be effected over a conductor or circuit 8 and through an impulse meter 6. When the actual value in comparing unit 5 equals the preset desired value, a signal is given from comparing unit 5 to device 7, or the furnace may be automatically switched off through circuit 8. The signal to device 7 may also initiate the second processing stage. During the first melting period, as illustrated in FIG. 1, the consumption of electric energy is kept constant by presetting the desired value thereof, while the batch or charge weight is variable.

Figure 2:
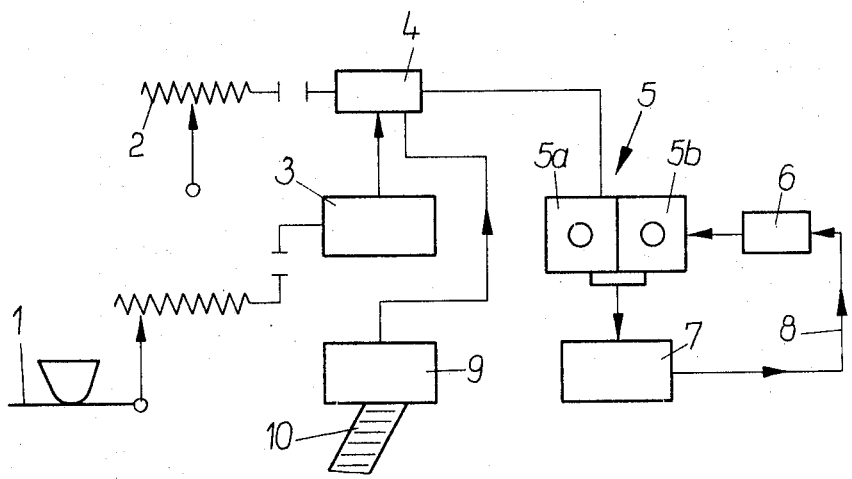
FIG. 2 is a schematic diagram of the invention control system as used during a succeeding process stage embodying the method of the invention, such as the processing of liquid or molten metal.

During the succeeding process stage, which is schematically illustrated in FIG. 2, the batch or charge weight is kept constant. This succeeding process stage may be an operation involving liquid or molten material. In FIG. 2, the constant charge weight is multiplied by the variable specific energy consumption corresponding to the further processing stages. Thus, transmission of the batch or charge weight and transmission of the specific melt-down energy consumption to the ton value storage unit 3 and the computer 4, respectively, are interrupted. The variable values of the specific consumptions for the stages of the liquid or molten material operation are determined by device 9 and fed to the computer or multiplier 4. These determinations by device 9 can be effected by means of a punched card 10, or manually. In computer or multiplier 4, the constant ton value is multiplied by the variable desired specific consumptions and transmitted, as a new desired value, to one half 5a of comparing unit 5. The actual energy consumption values are transmitted through impulse meter 6 to the half 5b of comparing unit 5. In the same manner as for FIG. 1, when the actual energy consumption value, comparing unit 5 supplies a signal to device 7. This signal may be used to initiate the succeeding process stage, by switching over the furnace, and advancing the punched tape or punched card 10.

What is claimed is:

1. A control system for batch-type electric melting furnaces, such as electric arc and induction furnaces, comprising, in combination, a comparing unit; means combining the weight of a batch of material, to be charged into the furnace and the specific electric energy input for the material in kwh. per ton, to derive a desired total electric energy input value; means applying, to one input of said comparing unit, a first input signal corresponding to such desired total electric energy input value; means applying, to the other side of said comparing unit, a second input signal corresponding to the value of the actual electric energy consumed during the process stage; said comparing unit, when the desired electric energy input value and the actual electric energy consumed value attain equality, providing an output signal; and means connected to said comparing unit and terminating the particular process stage responsive to said output signal.

2. A control system, as claimed in claim 1, including a multiplier providing, as an output, the total desired electric energy input value; means applying to said multiplier the specific electric energy in kwh. per ton; and means applying to said multiplier a value corresponding to the weight of the batch to be charged into the furnace.

3. A control system, as claimed in 1, in which only the total electric energy required for the relevant processing stage is used as the desired electric energy input value in all processing stages; both the desired electric energy input value and the actual electric energy consumed value being determined by ascending counts; the counting being restarted from zero for each process stage.

4. A control system, as claimed in claim 1, in which, in the case of successive process stages, the desired value of the total energy input for melting the first batch of a heat is maintained lower than that for the last batch of the heat, whereby a succeeding batch of the heat is added to the furnace before the immediately preceding batch has been fully melted down.

5. A control system, as claimed in claim 1, including means providing, in each process stage, except the initial melting-down stage, a desired total electric energy input value respective to the particular process stage.

6. A control system, as claimed in claim 5, in which said last-named means comprises manually operable means.

7. A control system, as claimed in claim 5, in which said last-named means comprises an automatically operable means using punched input information.

8. A control system, as claimed in claim 2, including an adding unit transmitting the weight of the batch to said multiplier.

9. A control system, as claimed in claim 8, in which said adding unit transmits the batch weight value to said comparing unit.

10. A control system, as claimed in claim 1, including digital computing units calculating the actual and desired energy values for each process stage.

11. A control system, as claimed in claim 1, including analog computing units calculating the actual and desired energy values for each process stage.

12. A control system, as claimed in claim 8, in which, in the initial melting-down stage, said multiplier is connected to said setting means and said adder is connected to said weighing means; in each succeeding process stage, said multiplier is disconnected from said setting means and said adder is disconnected from said weighing means; and automatic means connected to said multiplier in each process stage succeeding said melting-down stage and applying a desired electric energy input value to said multiplier in accordance with punched input information to said automatic means and corresponding to the respective succeeding process stages.

References Cited

UNITED STATES PATENTS 3,179,734  4/1965  Redel, et al. _____ 13—12

BERNARD A. GILHEANY, Primary Examiner

R. N. ENVALL, JR., Assistant Examiner